United States Patent
Susak et al.

(10) Patent No.: US 9,739,669 B2
(45) Date of Patent: Aug. 22, 2017

(54) TEMPERATURE SENSOR PERIPHERAL HAVING INDEPENDENT TEMPERATURE COEFFICIENT AND OFFSET ADJUSTMENT PROGRAMMABILITY

(71) Applicant: Microchip Technology Incorporated, Chandler, AZ (US)

(72) Inventors: David Michael Susak, Chandler, AZ (US); Raghuveer Murukumpet, Bangalore (IN)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 679 days.

(21) Appl. No.: 14/097,405

(22) Filed: Dec. 5, 2013

(65) Prior Publication Data

US 2014/0161149 A1  Jun. 12, 2014

Related U.S. Application Data

(60) Provisional application No. 61/735,243, filed on Dec. 10, 2012.

(51) Int. Cl.
| | | |
|---|---|---|
| *G01K 7/00* | (2006.01) | |
| *G01K 15/00* | (2006.01) | |
| *G01K 7/01* | (2006.01) | |
| *G01K 7/21* | (2006.01) | |

(52) U.S. Cl.
CPC ............ *G01K 15/005* (2013.01); *G01K 7/01* (2013.01); *G01K 7/21* (2013.01)

(58) Field of Classification Search
USPC .................. 374/178, 173, 163; 327/513
See application file for complete search history.

(56) References Cited

U.S. PATENT DOCUMENTS

| | | | |
|---|---|---|---|
| 4,652,144 A | 3/1987 | Gunther et al. | 327/512 |
| 6,183,131 B1 * | 2/2001 | Holloway | G01K 7/21 |
| | | | 327/512 |
| 6,377,110 B1 | 4/2002 | Cooper | 327/513 |
| 6,921,199 B2 | 7/2005 | Aota et al. | 374/178 |
| 7,439,601 B2 | 10/2008 | Hartley | 257/467 |
| 8,210,743 B2 | 7/2012 | Hasegawa | 374/178 |
| 2006/0103449 A1 | 5/2006 | Watanabe et al. | 327/512 |

(Continued)

FOREIGN PATENT DOCUMENTS

| | | | |
|---|---|---|---|
| CN | 101655396 A | 2/2010 | G01K 7/01 |
| EP | 0160836 B1 | 9/1989 | G01K 7/01 |
| JP | 2003279420 A | 10/2003 | G01K 7/00 |

OTHER PUBLICATIONS

Chinese Office Action, Application No. 201380069798.9, 10 pages, Dec. 29, 2016.

(Continued)

*Primary Examiner* — Mirellys Jagan
(74) *Attorney, Agent, or Firm* — Slayden Grubert Beard PLLC

(57) ABSTRACT

A temperature sensor peripheral generates an output voltage that is proportional to temperature, whose temperature coefficient can be adjusted to any desired value, whose temperature coefficient can be either positive or negative, whose room temperature voltage can be adjusted to any desired value, and whose temperature coefficient and room temperature voltage adjustments are independent from one another.

15 Claims, 8 Drawing Sheets

(56) References Cited

U.S. PATENT DOCUMENTS

| | | | | |
|---|---|---|---|---|
| 2007/0098042 A1* | 5/2007 | Choi | ............... | G01K 7/015 |
| | | | | 374/170 |
| 2009/0323763 A1* | 12/2009 | Raychowdhury | ...... | G01K 7/015 |
| | | | | 374/170 |
| 2011/0291871 A1* | 12/2011 | Lin | ............... | H03M 1/52 |
| | | | | 341/155 |
| 2012/0140792 A1* | 6/2012 | Yeh | ............... | G01K 7/01 |
| | | | | 374/170 |

OTHER PUBLICATIONS

European Office Action, Application No. 13811744.5, 5 pages, Feb. 9, 2017.
International Search Report and Written Opinion, Application No. PCT/US2013/074015, 11 pages, Jul. 17, 2014.

* cited by examiner $$Vout = Vref3 + \left[ \frac{Vref2}{R2} - \frac{Vref1}{R1} \right] R3$$

$$Vout = Vref3 + \frac{R3}{R2}Vref2 - \frac{R3}{R1}Vref1$$

$$\frac{dVout}{dT} = \frac{dVref3}{dT} + \frac{R3}{R2}\frac{dVref2}{dT} - \frac{R3}{R1}\frac{dVref1}{dT}$$

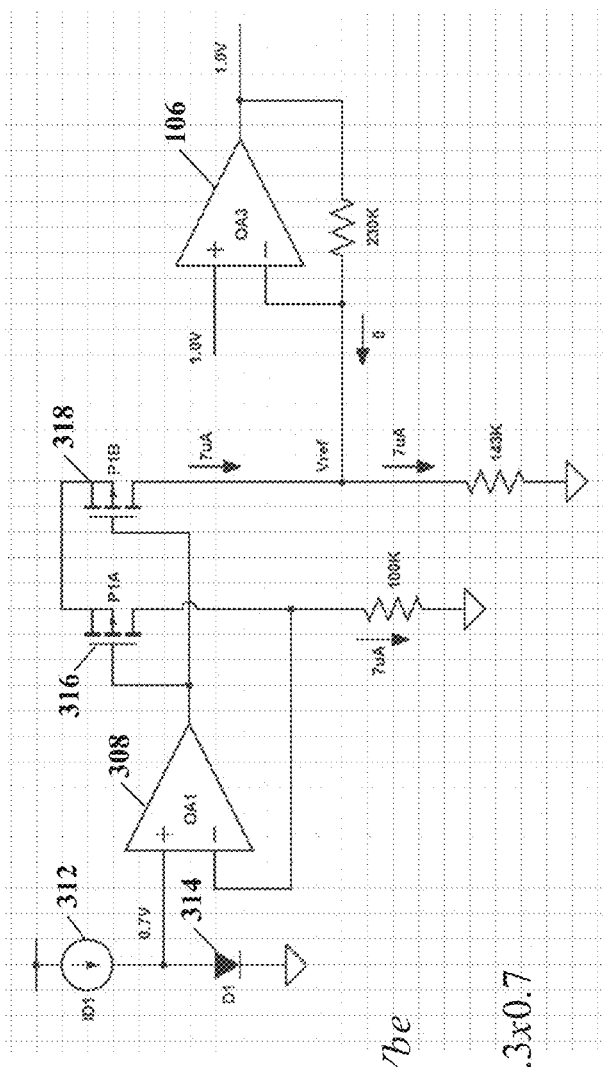

$$If \Rightarrow \frac{dVout}{dT} = 5mV/C$$

$$And \Rightarrow \frac{dVbe}{dT} = -2.17mV/C$$

$$Then \Rightarrow m = -\frac{5mV/C}{-2.17mV/C}$$

$$m = 2.3$$

$$If \Rightarrow Vout = 1.0V$$
$$Then \Rightarrow Vref = 1.0V$$
$$And \Rightarrow Vbe = 0.7V$$

$$With \Rightarrow Vout = \left[1 + \frac{m}{n}\right]Vref - mVbe$$

$$Then \Rightarrow 1.0V = \left[1 + \frac{2.3}{n}\right]1.0V - 2.3 \times 0.7$$

$$Solving \Rightarrow n = 1.43$$

$$Setting \Rightarrow R = 100K$$

TEMPERATURE SENSOR PERIPHERAL HAVING INDEPENDENT TEMPERATURE COEFFICIENT AND OFFSET ADJUSTMENT PROGRAMMABILITY

RELATED PATENT APPLICATION

This application claims priority to commonly owned U.S. Provisional Patent Application Ser. No. 61/735,243 filed Dec. 10, 2012; which is hereby incorporated by reference herein for all purposes.

TECHNICAL FIELD

The present disclosure relates to temperature sensing apparatus, and, in particular, a temperature sensor peripheral having independent temperature coefficient and offset adjustment programmability.

BACKGROUND

A prior technology temperature sensor apparatus is described in U.S. Pat. No. 7,439,601. The device disclosed therein sums two currents and then drives another resistor. By definition the voltage representing the temperature (Vtemp) is interrelated to the temperature coefficient of the voltage (TCVtemp) representing the temperature (Vtemp). Therefore Vtemp and d(Vtemp)/dTemp are not independent of each other.

SUMMARY

There exists a need for a temperature sensor peripheral used in integrated circuit (IC) micro-controllers that can generate a voltage that may be used for purposes external to the IC and that is: a) proportional to temperature, b) whose temperature coefficient can be adjusted at the temperature probe to any desired value, c) whose temperature coefficient can be either positive or negative, d) whose room temperature voltage can be adjusted at the temperature probe to any desired value, and e) whose temperature coefficient and room temperature voltage are completely independent of one another.

According to an embodiment, a circuit arrangement for measuring a temperature and producing a voltage representative thereof may comprise: first and second voltage-to-current converters each having a voltage input, a current adjust input and a current output; a first operational amplifier having first and second inputs and an output; a first resistor coupled to the current adjust input of the first voltage-to-current converter, wherein the first resistor may adjust a value of a first current from the current output thereof; a second resistor coupled to the current adjust input of the second voltage-to-current converter, wherein the second resistor may adjust a value of a second current from the current output thereof; a third resistor coupled between the output and the second input of the first operational amplifier; the outputs of the first and second voltage-to-current converters and the second input of the first operational amplifier may be coupled together; a first reference voltage may be coupled to the voltage input of the first voltage-to-current converter; a second reference voltage may be coupled to the voltage input of the second voltage-to-current converter; and a third reference voltage may be coupled to the first input of the operational amplifier; wherein a third current through the third resistor may be equal to the second current minus the first current.

According to a further embodiment, the first input of the first operational amplifier may be a positive input and the second input thereof may be a negative input. According to a further embodiment, the third reference voltage may be from a digital-to-analog converter (DAC). According to a further embodiment, an output voltage from the first operational amplifier may be equal to the second reference voltage value times the third resistor value divided by the second resistor value minus the first reference voltage value times the third resistor value divided by the first resistor value plus the third reference voltage value. According to a further embodiment, the first reference voltage may be from a temperature sensor having a voltage output proportional to a temperature thereof, and the second and third reference voltages may be from fixed voltage references having substantially zero temperature coefficients. According to a further embodiment, the first and second voltage-to-current converters may be provided by a second operational amplifier, and first and second transistors having sources coupled together, gates coupled to an output of the second operational amplifier, and drains coupled to the first and second resistors.

According to a further embodiment, the second and third reference voltages may be from the same voltage reference. According to a further embodiment, the first reference voltage may be from a temperature sensor, the third reference voltage and the second resistor value may determine a first output voltage representing a first calibration temperature, and the third resistor value may determine a second output voltage representing a second calibration temperature. According to a further embodiment, the first calibration temperature may be room temperature. According to a further embodiment, the temperature sensor may be a semiconductor diode providing a diode junction voltage as a function of temperature. According to a further embodiment, the temperature sensor may be a resistance temperature detector. According to a further embodiment, the temperature sensor may be a thermistor. According to a further embodiment, the second resistor may be adjusted so that a voltage from the output of the first operational amplifier may be equal to the third reference voltage, and the second current may be equal to the first current.

According to another embodiment, a mixed signal integrated circuit adapted for coupling to a temperature sensor and providing voltages proportional to temperatures measured by the temperature sensor may comprise: a digital processor and memory; a temperature sensor peripheral that may comprise a first operational amplifier having first and second inputs and an output, a third resistor coupled between the output and the second input of the first operational amplifier, a second operational amplifier having first and second inputs and an output, first and second transistors having sources coupled together, gates coupled to an output of the second operational amplifier, and drains coupled to first and second resistors; wherein a temperature sensor may be coupled to the first input of the second operational amplifier, and a reference voltage may be coupled to the first input of the first operational amplifier; wherein the output of the first operational amplifier may provide an output voltage proportional to a temperature measured by the temperature sensor.

According to a further embodiment, the first, second and third resistors may be programmable and controlled by the digital processor. According to a further embodiment, a digital-to-analog converter may be coupled to the digital processor and provide a programmable reference voltage. According to a further embodiment, an analog-to-digital converter may have an input coupled to the output of the first operational amplifier and an output coupled to the digital processor. According to a further embodiment, the mixed signal integrated circuit may comprise a microcontroller.

According to yet another embodiment, a circuit arrangement for measuring a temperature may comprise: two current generation circuits that may provide first and second currents in two different paths, wherein one of the first or second currents may be dependent upon temperature; the first and second currents may be combined and converted into a voltage Vtemp, wherein the voltage Vtemp may be dependent upon the temperature.

According to a further embodiment, the voltage Vtemp may be equal to a reference voltage when the first and second currents may be equal. According to a further embodiment, the combined first and second currents may be converted into the voltage Vtemp by an amplifier having a feedback resistor. According to a further embodiment, the feedback resistor may determine a variation of the voltage Vtemp over a variation of the temperature. According to a further embodiment, the two current generation currents may be voltage-to-current converters, and the temperature may be measured by a temperature sensor having a voltage output coupled to one of the two voltage-to-current converters.

According to still another embodiment, a method for measuring temperatures and producing voltages representative thereof may comprise the steps of: determining a first voltage representing a first calibration temperature; adjusting a first output voltage from a temperature sensor peripheral to equal the first voltage when a temperature sensor may be at the first calibration temperature; determining a range of voltages to represent a range of temperatures, wherein the first voltage may be within the range of voltages and the first calibration temperature may be within the range of temperatures; determining a second voltage representing a second calibration temperature within the range of temperatures; and adjusting a second output voltage from the temperature sensor peripheral to equal the second voltage when the temperature sensor may be at the second calibration temperature.

According to a further embodiment of the method, the first voltage may be equal to a reference voltage coupled to an input of an operational amplifier of the temperature sensor peripheral. According to a further embodiment of the method, the first calibration temperature may be room temperature.

BRIEF DESCRIPTION OF THE DRAWINGS

A more complete understanding of the present disclosure may be acquired by referring to the following description taken in conjunction with the accompanying drawings wherein:

FIG. 5 illustrates a schematic diagram of the temperature sensor peripheral shown in FIGS. 3 and 4 with exemplary component values and circuit voltage relationships thereof, according to the teachings of this disclosure;

Figure 1:
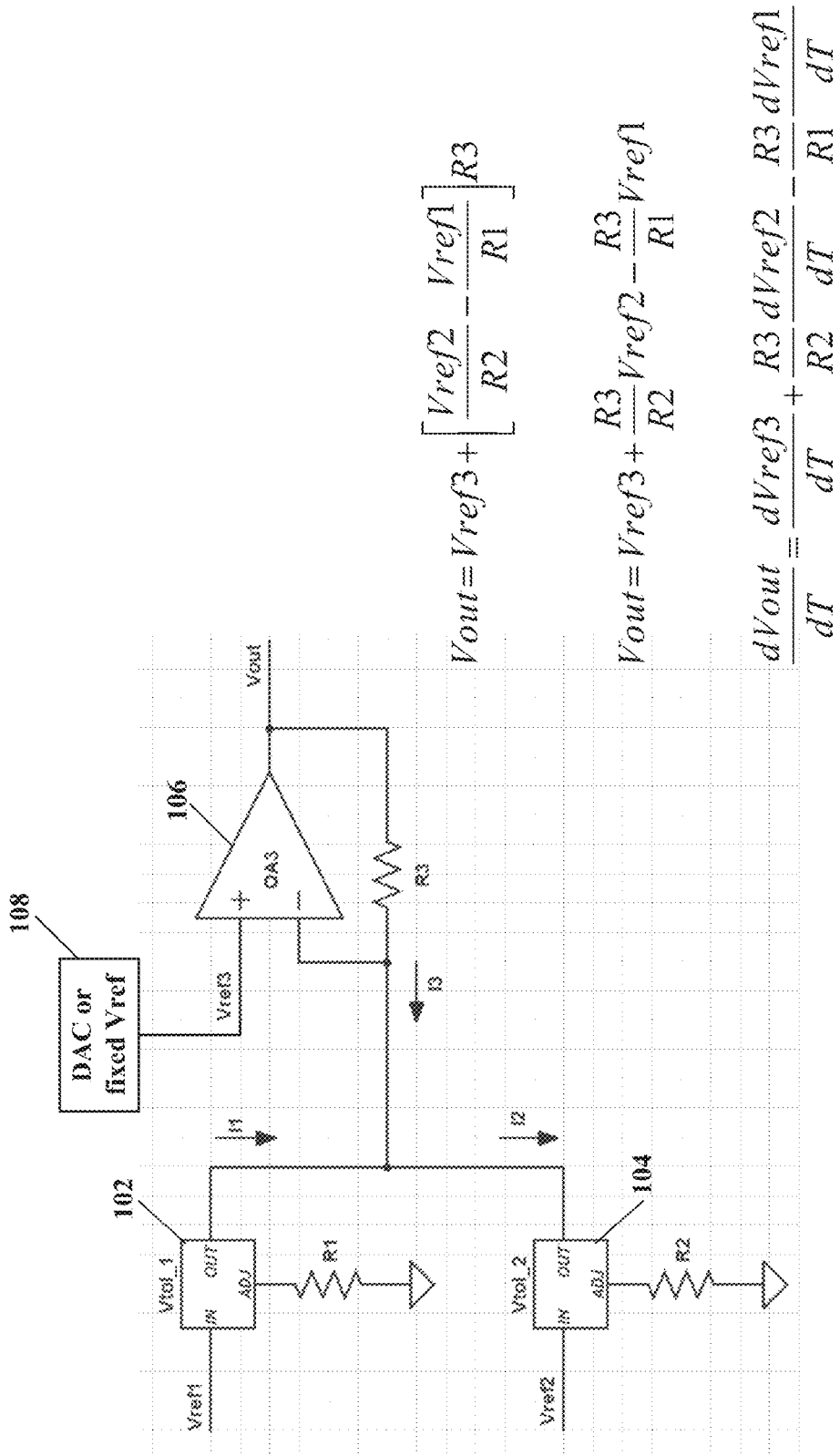
FIG. 1 illustrates a schematic diagram of a temperature sensor peripheral and circuit voltage relationships thereof, according to a specific example embodiment of this disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

According to various embodiments, a circuit may be provided that generates a voltage proportional to temperature and whose temperature coefficient, polarity of temperature coefficient and room temperature voltage are independently user selectable.

Referring now to the drawings, the details of specific example embodiments are schematically illustrated. Like elements in the drawings will be represented by like numbers, and similar elements will be represented by like numbers with a different lower case letter suffix.

Referring to FIG. 1, depicted is a schematic diagram of a temperature sensor peripheral and circuit voltage relationships thereof, according to a specific example embodiment of this disclosure. A first voltage-to-current converter 102 has a voltage input coupled to a first reference voltage Vref1 that is converted to a first current I1 and is available at an output thereof. A second voltage-to-current converter 102 has a voltage input coupled to a second reference voltage Vref2 that is converted to a second current I2 and is available at an output thereof. An operational amplifier 106 has a negative input coupled to the outputs of the first and second voltage-to-current converters 102 and 104, a positive input coupled to a third reference voltage Vref3 and a resistor R3 coupled between an output and the negative input of the operational amplifier 106. The first and second reference voltages may or may not have the same temperature coefficient (TC). One of the reference voltages may be provided by a voltage reference having substantially no temperature coefficient (TC), e.g., substantially the same output voltage over all temperatures of operation, e.g., a bandgap voltage reference, etc. The other reference voltage may be provided by a temperature measurement sensor, e.g., diode junction, resistance temperature detector (RTD), thermistor, etc., having either a positive or negative temperature coefficient (TC). Any one or more of the reference voltages, e.g., Vref3, Vref2; or Vref3, Vref1; may be provided by a digital-to-analog converter (DAC) 108.

The first current I1 from the first voltage-to-current converter 102 may be adjusted with a first resistor R1 coupled to a current adjustment input thereof. The second output current I2 from the second voltage-to-current converter 104 may be adjusted with a second resistor R2 coupled to a current adjustment input thereof. The operational amplifier 106 forces a third current I3 to equal the difference between the first and second currents (I3=I2−I1).

Shown in FIG. 1 are the mathematical relationships between the output voltage Vout from the operational amplifier 106; the first, second and third voltage references Vref1, Vref2 and Vref3; and the first, second and third resistors R1, R2 and R3. Also shown is the mathematical relationship of a change in output voltage dVout in relation to a change in temperature dT. When a dVref term(s) is (are) substantially zero, then only the non-zero dVref term determines dVout/dT, after Vout has been adjusted to substantially equal Vref3, as more fully described hereinafter.

According to the teachings of this disclosure, two currents I1 and I2 having different temperature coefficients, one negative and the other positive, may be generated then summed together and the resultant current I3 converted back to a voltage Vout. The operational amplifier 106 regulates the summing node (I3=I2−I1) to equal Vref3. The operational amplifier 106 feedback then forces the output voltage Vout to equal I3 times R3 plus Vref3. Therefore, when I3 is substantially zero, i.e., I2=I1, I2−I1=0, then Vout=Vref3. So by selecting different reference voltages Vref1, Vref2 and Vref3, a composite output voltage Vout may be generated having a desired voltage offset and slope. A real world design would most likely not vary all of these parameters. By varying only one of the reference voltages and keeping the other reference voltages constant a reliable output voltage with a well defined temperature coefficient may be provided. Either the first reference voltage Vref1 or the second reference voltage Vref2 may be controlled by a temperature sensor, e.g., diode junction, resistance temperature detector (RTD), thermistor, etc. Appropriate temperature-to-voltage conversion may be provided by controlling the second reference voltage Vref2 with a temperature sensor having a positive temperature coefficient, or controlling the first reference voltage Vref1 with a temperature sensor having a negative temperature coefficient.

Besides temperature measurement applications, it is contemplated and within the scope of this disclosure that the first and second reference voltages Vref1 and/or Vref2 may vary with temperature and the circuit described hereinabove adjusted in such a way that the output voltage Vout thereof may be used for voltage controlled temperature compensation of another circuit that may need either positive or negative temperature compensation, e.g., a voltage controlled oscillator having frequency determining components when coupled together have either a positive or negative temperature coefficient that must be compensated for over an operating temperature range.

Another feature of the present invention is completely independent output voltage adjustment (output voltage offset) and voltage/temperature coefficient adjustment (range of dVout/dT) when the output voltage Vout is adjusted to be substantially equal to the third reference voltage Vref at a first calibration temperature. For example, first determine what output voltage range is required over the temperature range of interest. Then determine what the output voltage Vout of that voltage range would be at room temperature, e.g., 27 degrees Centigrade (° C.). Then set the third reference voltage Vref3 to that voltage, or use an existing third reference voltage Vref3 to define the first calibration voltage, e.g., Vout at a first calibration temperature, e.g., room temperature. Next set the output voltage Vout to be substantially the same value as the third reference voltage Vref3 by adjusting the second resistor R2 at room temperature, whereby the third current I3 will be substantially zero (0). What is being accomplished is to substantially match the first current I1 (I1=Vref1/R1) to the second current I2 (I2=Vref2/R2) that is being controlled by the temperature sensor voltage Vref2 at room temperature (or any other first calibration temperature) and the second resistor R2.

Output voltage change dVout versus temperature change dT (temperature coefficient) may be determined next. Select a second temperature (second calibration temperature) different from the first calibration temperature (e.g., room temperature), e.g., higher or lower. Calculate what the output voltage Vout would be at the second temperature based upon the temperature coefficient desired (dVout/dT). At the second temperature adjust the third resistor R3 so that the output voltage Vout is at substantially the calculated output voltage of the second calibration temperature. Thus accurate and independent adjustments of the output voltage and temperature coefficient (change in output voltage versus temperature) are easily accomplished for any output voltage offset and temperature coefficient desired with substantially no interaction therebetween.

Figure 2:
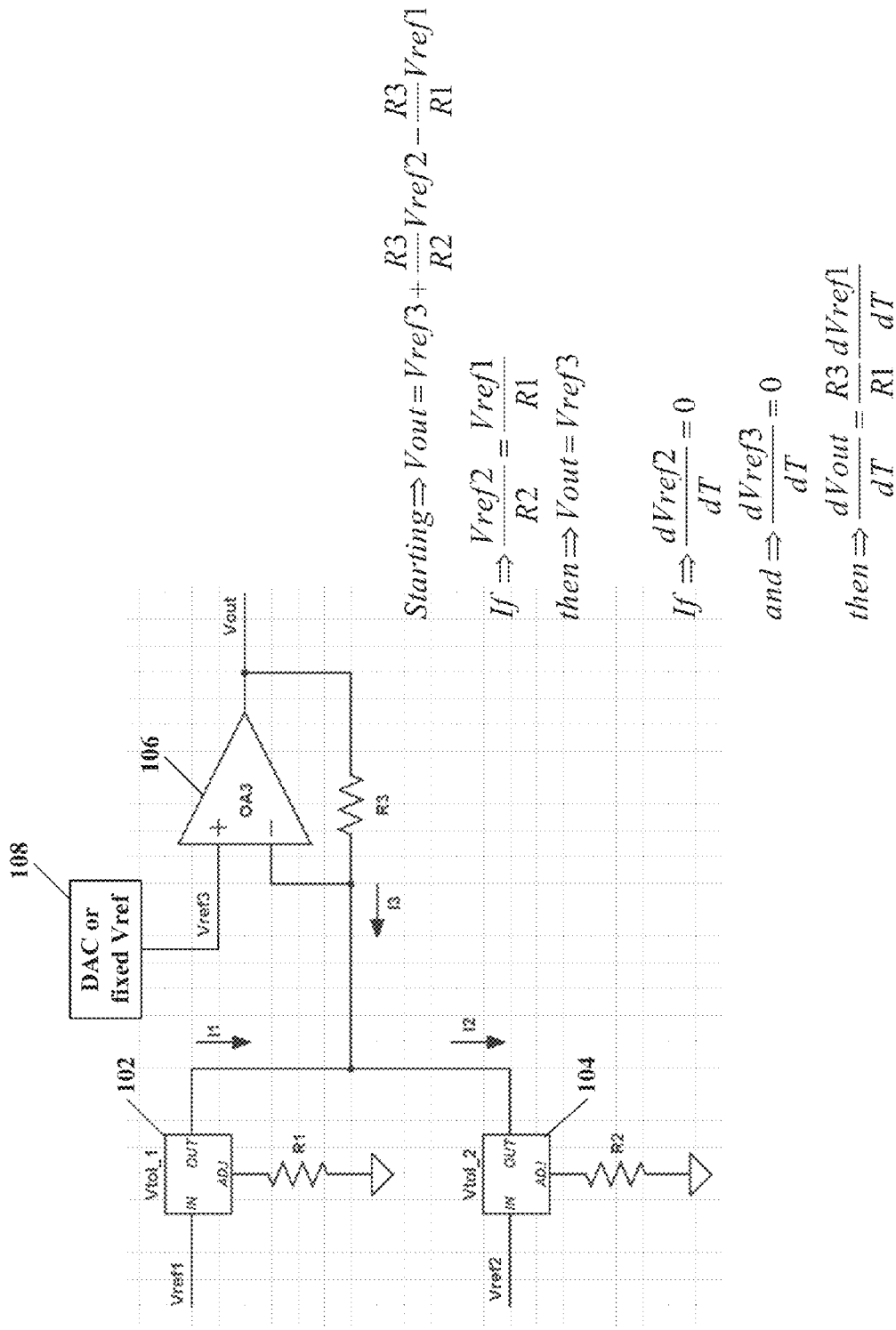
FIG. 2 illustrates a schematic diagram of the temperature sensor peripheral shown in FIG. 1 and circuit voltage relationships thereof.

Referring to FIG. 2, depicted is a schematic diagram of the temperature sensor peripheral shown in FIG. 1 and circuit voltage relationships thereof. Below is an example showing how the room temperature voltage may be set independent of the temperature coefficient. For this example there are two assumptions: I1=I2, Vref2 and Vref3 do not change with temperature. If this is the case then the room temperature voltage may be set by adjusting the second resistor R2 so that the first current I1 equals the second current I2 and the temperature coefficient may be changed by adjusting the third resistor R3. In this example the first resistor R1 is held constant since it shows up in both the Vout and dVout/dT equations.

Figure 3:
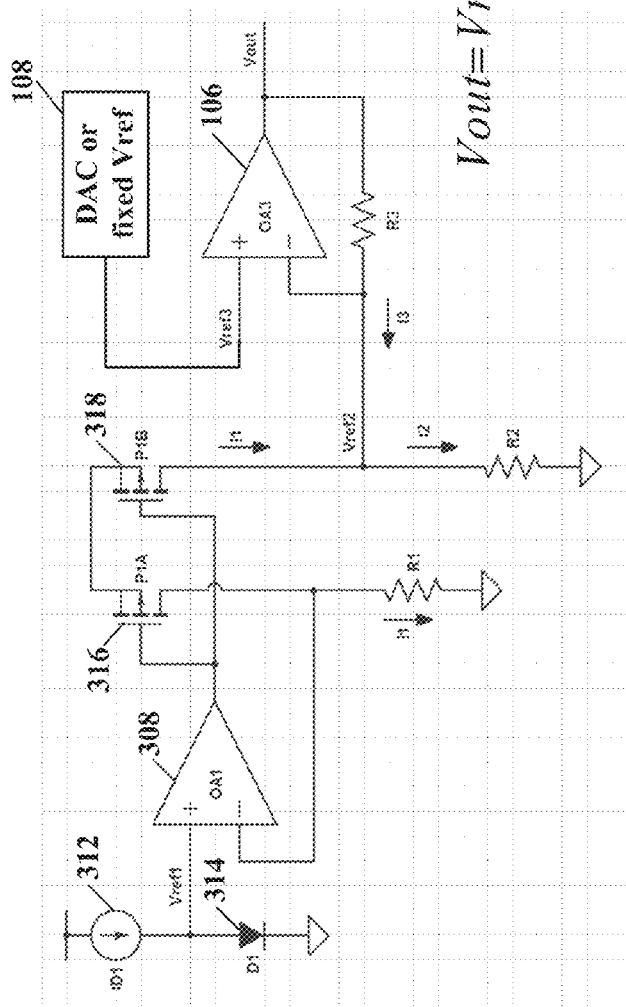
FIG. 3 illustrates a schematic diagram of a temperature sensor peripheral, temperature sensor probe connected thereto and circuit voltage relationships thereof, according to another specific example embodiment of this disclosure.
Figure 4:
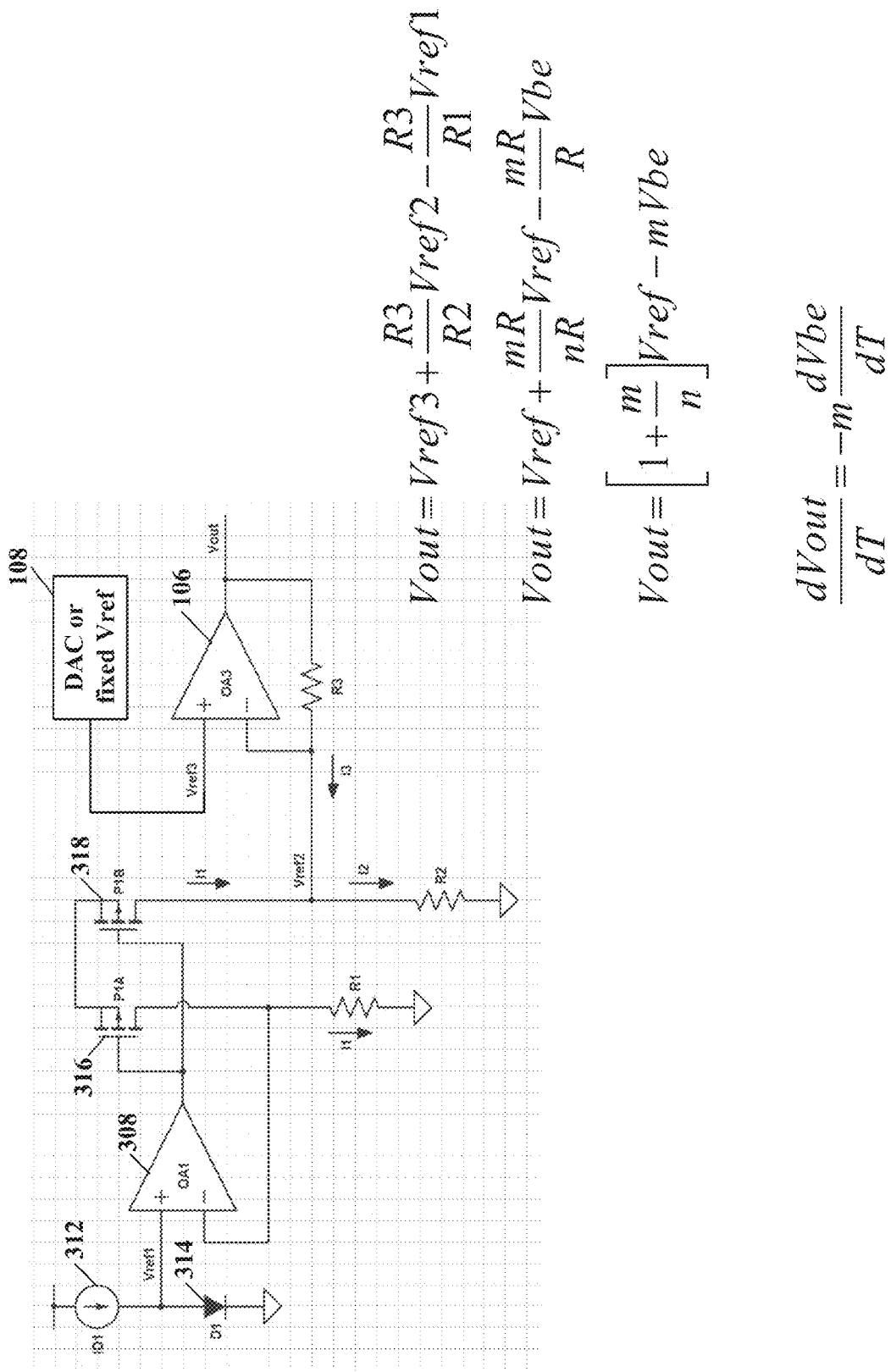
FIG. 4 illustrates a schematic diagram of the temperature sensor peripheral shown in FIG. 3 and circuit voltage relationships thereof.

Referring to FIGS. 3 and 4, depicted is a schematic diagram of a temperature sensor peripheral, temperature sensor probe connected thereto and circuit voltage relationships thereof, according to another specific example embodiment of this disclosure. A second operational amplifier 308, and transistors 316 and 318 may function as the first and second voltage-to-current converters 102 and 104 shown in FIGS. 1 and 2. The second reference voltage Vref2 will automatically be substantially the same voltage as the third reference voltage Vref3 due to operation of the operational amplifier 106 with the feedback resistor R3. Circuit function, adjustment and operation thereof may be substantially the same as described hereinabove for FIGS. 1 and 2.

A diode temperature sensor 314 may be coupled to a current source 312 and a resulting diode junction voltage Vbe dependent upon temperature may be coupled to a positive input of the operational amplifier 308. Since the third reference voltage Vref3 remains constant, e.g., from a band gap voltage reference (not shown) or a DAC 108, etc., the change in output voltage dVout is dependent only upon the change in the diode junction voltage dVbe. Voltage output Vout, offset and range may be adjusted as described hereinabove for a desired room temperature output voltage (first calibration output voltage at a first calibration temperature) and a desired dVout/dT (based upon a second calibration voltage at a second calibration temperature).

It is contemplated and within the scope of this disclosure that any temperature sensor providing a voltage output corresponding to a temperature may be utilized, and one having ordinary skill in electronic circuit design and the benefit of this disclosure would readily understand how to implement such temperature sensors in combination with the teachings of this disclosure.

Referring to FIG. 5, depicted is a schematic diagram of the temperature sensor peripheral shown in FIGS. 3 and 4 with exemplary component values and circuit voltage relationships thereof, according to the teachings of this disclosure. The calculated voltage and component values shown are derived at room temperature.

Figure 6:
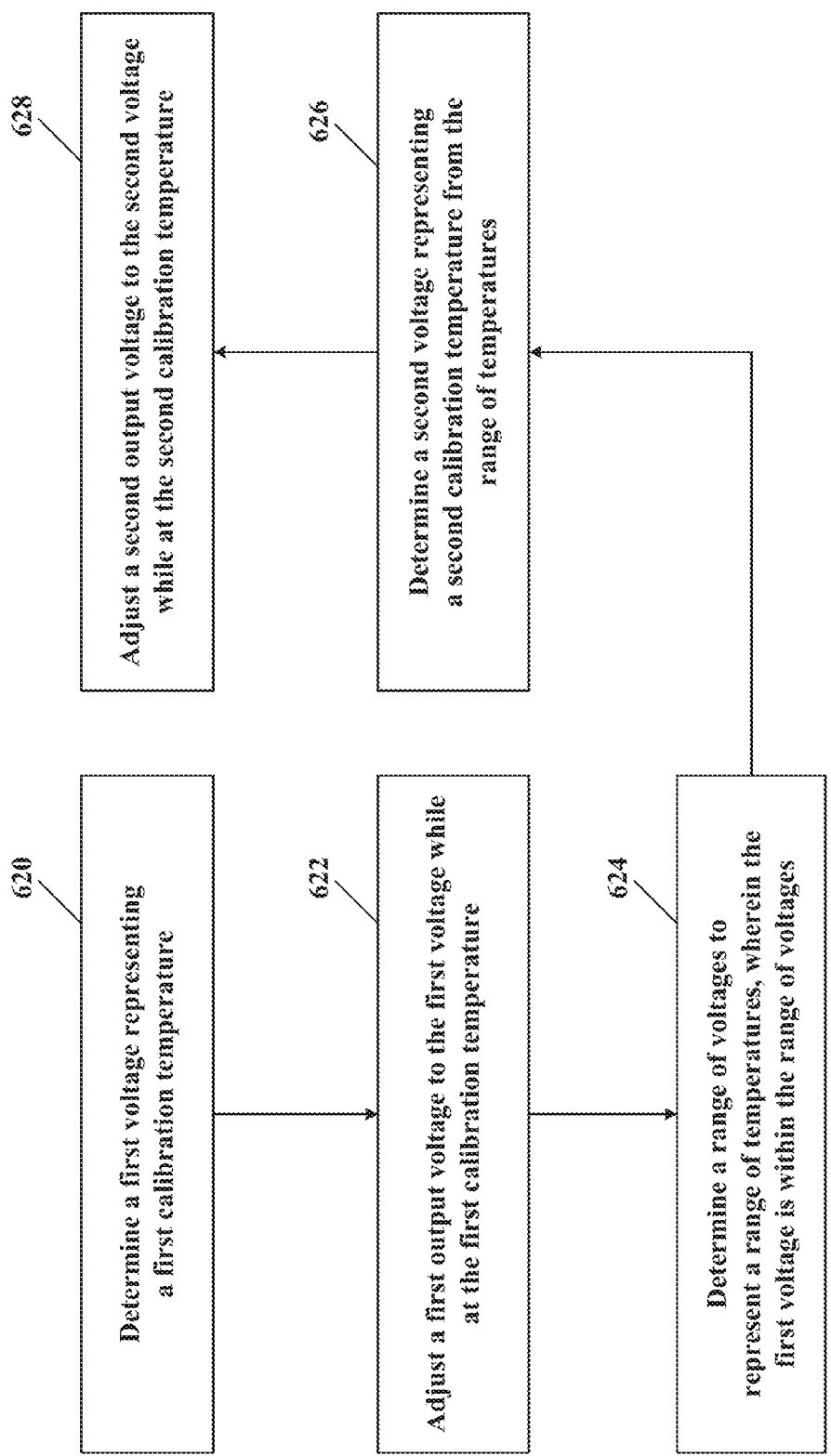
FIG. 6 illustrates a schematic process flow diagram for calibration of a temperature sensor peripheral, according to specific example embodiments of this disclosure.

Referring to FIG. 6, depicted is a schematic process flow diagram for calibration of a temperature sensor peripheral, according to specific example embodiments of this disclosure. In step 620 a first voltage representing a first calibration temperature is selected. In step 622 a first output voltage is adjusted to the first voltage while the temperature sensor is at the first calibration temperature. By picking Vref3 to be the first (trim) voltage, or visa versa, to represent the first calibration temperature, e.g., "room temperature" at the temperature sensor 314 (probe), the output voltage Vout is adjusted to Vref3, whereby I3=0, and I2=I1. In step 624 a range of voltages representing a range of temperatures is determined, e.g., slope dVout/dT (see FIG. 7), wherein the first voltage is within the range of voltages. In step 626 a second voltage representing a second calibration temperature within the range of temperatures is determined. In step 628 the temperature sensor peripheral is adjusted so that a second output voltage therefrom is substantially the same as the second voltage while the temperature sensor 314 is at the second calibration temperature. This sequence of two calibration adjustments, first setting the output voltage Vout to the reference voltage Vref3 while the temperature sensor 314 is at the first calibration temperature (e.g., room temperature) determines the output voltage offset, and next setting the output voltage Vout to the second voltage while the temperature sensor 314 is at the second calibration temperature, e.g., second calibration temperature different than the first calibration temperature, determines the slope of the change in output voltage dVout versus change in temperature dT with substantially no interaction between these two calibration adjustments.

Figure 7:
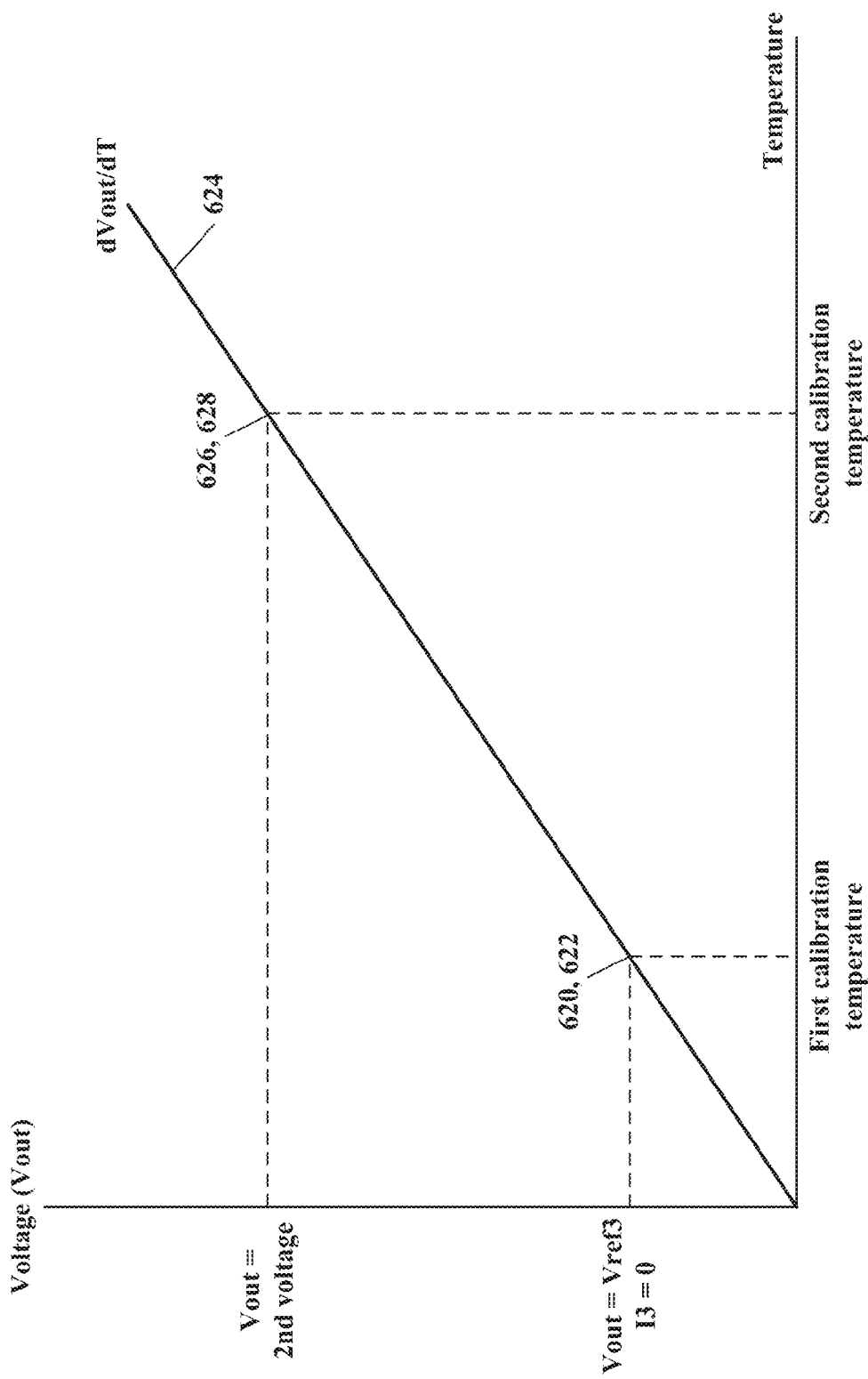
FIG. 7 illustrates a schematic temperature-voltage graph for temperature sensor peripheral calibration as more fully disclosed in the description of FIG. 6, according to specific example embodiments of this disclosure.

Referring to FIG. 7, depicted is a schematic temperature-voltage graph for temperature sensor peripheral calibration as more fully disclosed in the description of FIG. 6, according to specific example embodiments of this disclosure. The first calibration adjustment determines the output voltage offset at the first calibration temperature, and the second calibration adjustment determines the slope of the change in output voltage versus the change in temperature, dVout/dT. By adjusting the third reference voltage Vref3, any output voltage offset may be selected, e.g., by using a digital-to-analog converter (DAC) 108 to generate Vref3.

Figure 8:
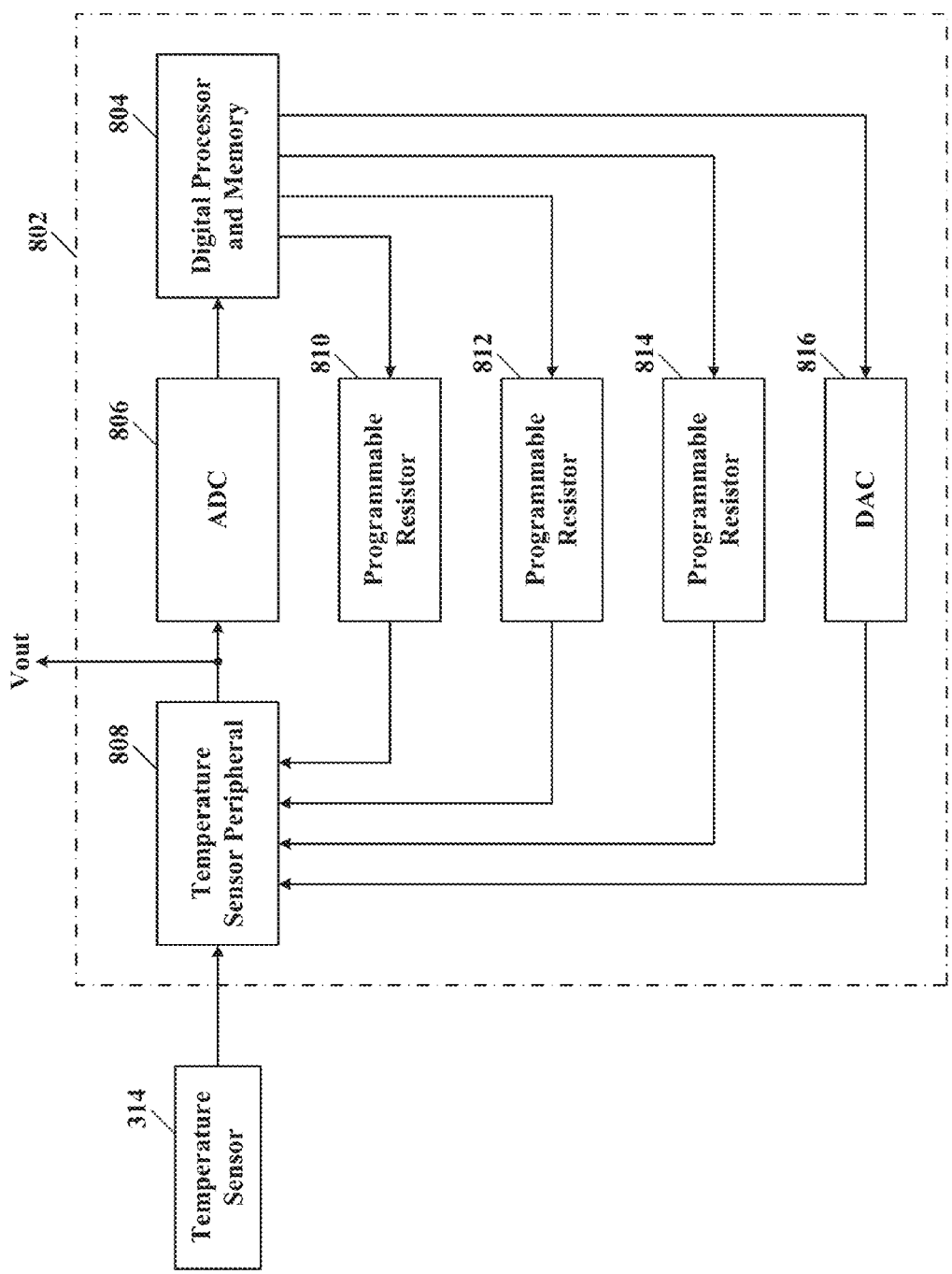
FIG. 8 illustrates a schematic block diagram of a mixed signal integrated circuit having a temperature sensor peripheral, according to the teachings of this disclosure.

Referring to FIG. 8, depicted is a schematic block diagram of a mixed signal integrated circuit having a temperature sensor peripheral, according to the teachings of this disclosure. A mixed signal integrated circuit 802, e.g., a microcontroller, may comprise a temperature sensor peripheral 808, an analog-to-digital converter (ADC) 806, a digital processor and memory 804, a digital-to-analog converter (DAC) 816, and programmable resistors 810, 812 and 814. A temperature sensor 314 may be coupled to an input of the temperature sensor peripheral 808, and an output voltage Vout may be provided from the temperature sensor peripheral 808. The output voltage Vout may be available for coupling to an external device and/or supplied to the ADC 806 for further processing by the digital processor 804. The DAC 816 may provide a reference voltage Vref3 to the temperature sensor peripheral 808, and programmable resistors 810, 812 and/or 814 may be used to provide output voltage offset and dVout/dT slope calibration, as more fully described hereinabove.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A circuit arrangement for measuring a temperature and producing a voltage representative thereof, comprising:
    first and second voltage-to-current converters each having a single voltage input, a current adjust input and a current output;
    a first operational amplifier having first and second inputs and an output;
    a first programmable resistor coupled to the current adjust input of the first voltage-to-current converter, wherein the first resistor adjusts a value of a first current from the current output thereof;
    a second programmable resistor coupled to the current adjust input of the second voltage-to-current converter, wherein the second resistor adjusts a value of a second current from the current output thereof;
    a third resistor coupled between the output and the second input of the first operational amplifier;
    the outputs of the first and second voltage-to-current converters and the second input of the first operational amplifier are coupled together;
    a first reference voltage coupled to the voltage input of the first voltage-to-current converter;
    a second reference voltage coupled to the voltage input of the second voltage-to-current converter;
    a third reference voltage provided by a digital to analog converter (DAC), wherein the third reference voltage is coupled to the first input of the operational amplifier;
    wherein a third current through the third resistor is equal to the second current minus the first current.

2. The circuit arrangement according to claim 1, wherein the first input of the first operational amplifier is a positive input and the second input thereof is a negative input.

3. The circuit arrangement according to claim 1, wherein an output voltage from the first operational amplifier is defined by:

$$Vref3 + \frac{R3}{R2}Vref2 - \frac{R3}{R1}Vref1,$$

wherein Vref1, Vref2, Vref3 represent a value of the first, second and third reference voltage, respectively, and R1, R2, and R3 represent a value of the first, second and third resistor.

4. The circuit arrangement according to claim 1, wherein the first reference voltage is provided by an external temperature sensor having a voltage output proportional to a temperature thereof, and the second and third reference voltages are from fixed voltage references having substantially zero temperature coefficients.

5. The circuit arrangement according to claim 1, wherein the second resistor is adjusted so that a voltage from the output of the first operational amplifier is equal to the third reference voltage, and the second current is equal to the first current.

6. The circuit arrangement according to claim 1, further comprising a digital processor configured to adjust a resistance of the first and second programmable resistor and to adjust the third reference voltage by controlling the DAC.

7. The circuit arrangement according to claim 1, wherein the third resistor is a programmable resistor.

8. The circuit arrangement according to claim 7, further comprising a digital processor configured to adjust a resistance of the first, second, and third programmable resistor and to adjust the third reference voltage by controlling the DAC.

9. The circuit arrangement according to claim 1, wherein the first and second voltage-to-current converters are provided by
a second operational amplifier, and
first and second transistors having sources coupled together, gates coupled to an output of the second operational amplifier, and drains coupled to the first and second resistors.

10. The circuit arrangement according to claim 9, wherein the second and third reference voltages are from the same voltage reference.

11. The circuit arrangement according to claim 1, wherein:
the first reference voltage is from a temperature sensor,
the third reference voltage and the second resistor value determine a first output voltage representing a first calibration temperature, and
the third resistor value determines a second output voltage representing a second calibration temperature.

12. The circuit arrangement according to claim 11, wherein the first calibration temperature is room temperature.

13. The circuit arrangement according to claim 11, wherein the temperature sensor is a semiconductor diode providing a diode junction voltage as a function of temperature.

14. The circuit arrangement according to claim 11, wherein the temperature sensor is a resistance temperature detector.

15. The circuit arrangement according to claim 11, wherein the temperature sensor is a thermistor.

* * * * *